United States Patent [19]

Cooper et al.

[11] Patent Number: 5,471,245
[45] Date of Patent: Nov. 28, 1995

[54] BULK CHARGED MODULATED DEVICE (BCMD) IMAGE SENSORS WITH INCREASED DYNAMIC RANGE

[75] Inventors: Alan N. Cooper, Coppell; William P. McCracken, Garland; Jaroslav Hynecek, Richardson, all of Tex.

[73] Assignee: Texas Instruments Incorporated, Dallas, Tex.

[21] Appl. No.: 245,933

[22] Filed: May 19, 1994

Related U.S. Application Data

[62] Division of Ser. No. 969,668, Oct. 30, 1992, Pat. No. 5,335,015.

[51] Int. Cl.[6] ..................................................... H04N 3/14
[52] U.S. Cl. ............................................. 348/302; 348/307
[58] Field of Search .................................... 348/302, 307, 348/294; 257/291, 221–230, 241–247; 250/208.1; H04N 3/14

[56] References Cited

U.S. PATENT DOCUMENTS

| | | | |
|---|---|---|---|
| 4,819,070 | 4/1989 | Hynecek | 348/302 |
| 4,901,129 | 2/1990 | Hynecek | 257/223 |
| 5,083,016 | 1/1992 | Wyles | 250/208.1 |
| 5,093,727 | 3/1992 | Kakinuma et al. | 250/208.1 |
| 5,128,534 | 7/1992 | Wyles | 250/208.1 |

OTHER PUBLICATIONS

A Bulk Charge Modulated Device (BCMD) Image Sensor, Neal Cooper, et al., Image Technology, TI Technical Journal, Sep.–Oct. 1991, pp. 14–19.
BCMD–An Improved Photosite Structure for High–Density Image Sensors, IEEE Transactions on Electron Devices, vol. 38, No. 5, May 1991, Jaroslav Hynecek, pp. 1011–1020.

Primary Examiner—Donald J. Yusko
Assistant Examiner—Michael Day
Attorney, Agent, or Firm—Alan K. Stewart; Richard L. Donaldson; William E. Hiller

[57] ABSTRACT

An image array with improved dynamic range has at least one photosite, at least one column sense line and at least one column clamp transistor. A source of the photosite is coupled to the column sense line. A source of the column clamp transistor is coupled to the photosite source. A drain of the column clamp transistor is coupled to a drain of the photosite. A gate of the column clamp transistor is provided for application of a $\phi_{cc}$ signal. The $\phi_{cc}$ signal is coupled through a capacitance to the column sense line.

1 Claim, 2 Drawing Sheets

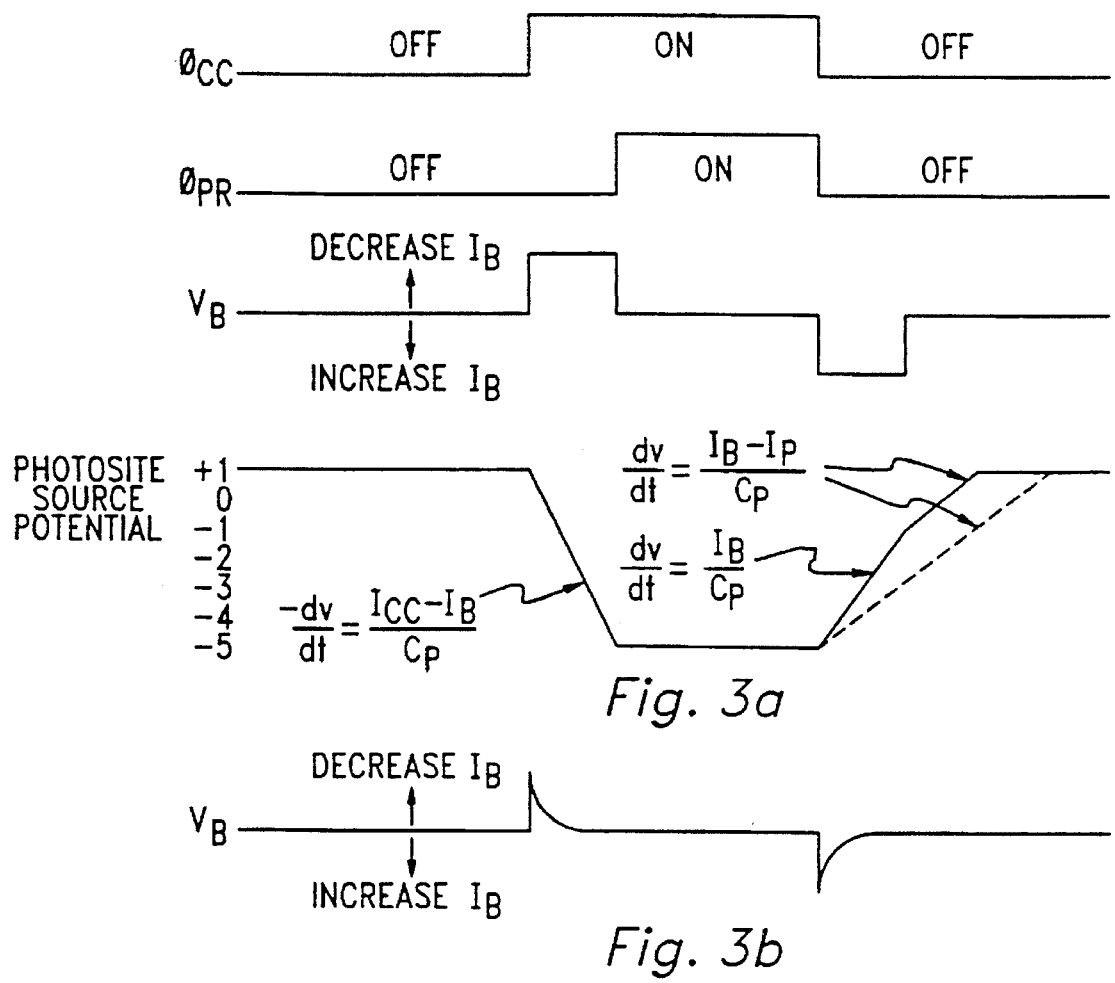
Fig. 3a
Fig. 3b
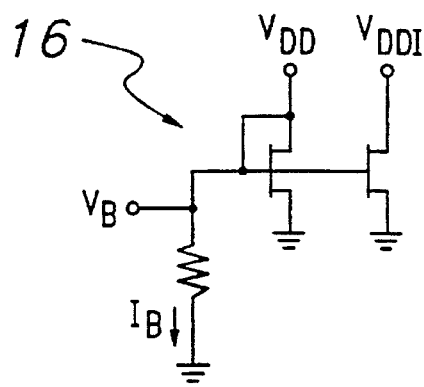
Fig. 4

BULK CHARGED MODULATED DEVICE (BCMD) IMAGE SENSORS WITH INCREASED DYNAMIC RANGE

This is a Divisional of application Ser. No. 07/969,668, filed Oct. 30, 1992, issued as U.S. Pat. No. 5,335,015 on Aug. 2, 1994.

NOTICE (C) Copyright, *M* Texas Instruments Incorporated 1992. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

FIELD OF THE INVENTION

This invention generally relates to bias configurations for BCMD image sensors.

BACKGROUND OF THE INVENTION

Without limiting the scope of the invention, its background is described in connection with bulk charge modulated device (BCMD) image sensors, as an example.

Heretofore, in this field, the bulk charge modulated device (BCMD) was developed to achieve optimal imaging performance in all aspects of image sensing. See Hynecek, J.,"Bulk Charge Modulated Transistor Threshold Image Sensor Elements and Method of Making", U.S. Pat. No. 4,901,129, issued Feb. 13, 1990, and Hynecek, J.,"BCMD— An Improved Structure for High-Density Image Sensors", *IEEE Transactions on Electron Devices,* Vol. 38, No. 5, May 1991, which are incorporated herein by reference. The BCMD possesses superior qualities such as zero reset noise, undetectable image smear and excellent blooming control. The sensor is fabricated using a modified p-well CMOS process, which makes it relatively inexpensive to manufacture and provides inherent advantages of low power and fast clocking speeds.

FIG. 1 is a schematic circuit diagram of a BCMD photosite array, indicated generally at 10. Each pixel in the image is represented by a photosite 12. The photosites 12 are arranged into an array of rows and columns, with the photosites 12 of each column connected to a common sense line 14, which is driven by a current source 16. After charge has been integrated in a row of photosites 12, a single row is selected by applying the appropriate signal to photosite gates 18 and the signal corresponding to the charge stored in the photosites 12 appears on sense lines 14 to be scanned.

A photosite reset operation is provided for by clearing the charge from the charge storage well of each photosite 12. This is accomplished by connecting the source and drain of the photosite 12 together and applying a negative potential to gate 18. An electronic shutter effect may therefore be implemented when using the array 10 which enables the device to be operated without the use of a mechanical iris to control the impinging light. This is accomplished by independently removing charge collected in a given row of photosites 12. By selecting the time interval between charge removal and readout, the effective integration time of the image sensor can be controlled to yield an optimal image.

However, with the increasing photosite density which is required to provide ever higher image sensor resolutions, the individual rows of the photosite array must be clocked at higher and higher speeds. Until now, the settling time of the photosite reset operation has been a limiting factor in the speed at which an image sensor array may be operated. It is therefore desirable to reduce the settling time of the photosite reset operation in order to increase the dynamic range of the BCMD image sensor. Accordingly, improvements which overcome this limitation are presently desirable.

SUMMARY OF THE INVENTION

It is herein recognized that a need exists for an image sensor array with improved dynamic range. The present invention is directed towards meeting those needs.

Generally, and in one form of the invention, an image array having at least one photosite, at least one column sense line and at least one column clamp transistor, is disclosed wherein a source of the photosite is coupled to the column sense line; a source of the column clamp transistor is coupled to the photosite source; a drain of the column clamp transistor is coupled to a drain of the photosite; a gate of the column clamp transistor is provided for application of a $\phi_{cc}$ signal; a current source is coupled to the column sense line through a resistance; and the $\phi_{cc}$ signal is coupled through a capacitance to the column sense line.

In another form of the invention, a method for improving the dynamic range of an image array photosite is disclosed, comprising the steps of: turning on a column clamp transistor having a source coupled to a photosite source and a drain coupled to a photosite drain; decreasing a current supplied to the column sense line below a quiescent value; turning on the photosite; turning off the photosite and the column clamp transistor at substantially the same time; increasing the current above the quiescent value; and returning the current to the quiescent value.

An advantage of the invention is that the dynamic range of the image sensor can be improved with very little added componentry.

BRIEF DESCRIPTION OF THE DRAWINGS

The foregoing and further aspects of the invention are illustrated in the accompanying drawings wherein like elements are denoted by like reference designators and in which:

FIG. 3A is a timing diagram of a first implementation of the first preferred embodiment of the present invention;

FIG. 3B is a timing diagram of a second implementation of the first preferred embodiment of the present invention;

FIG. 4 is a schematic circuit diagram of a controllable current source used to implement the first preferred embodiment of the present invention.

DETAILED DESCRIPTION OF PREFERRED EMBODIMENTS

Figure 1:
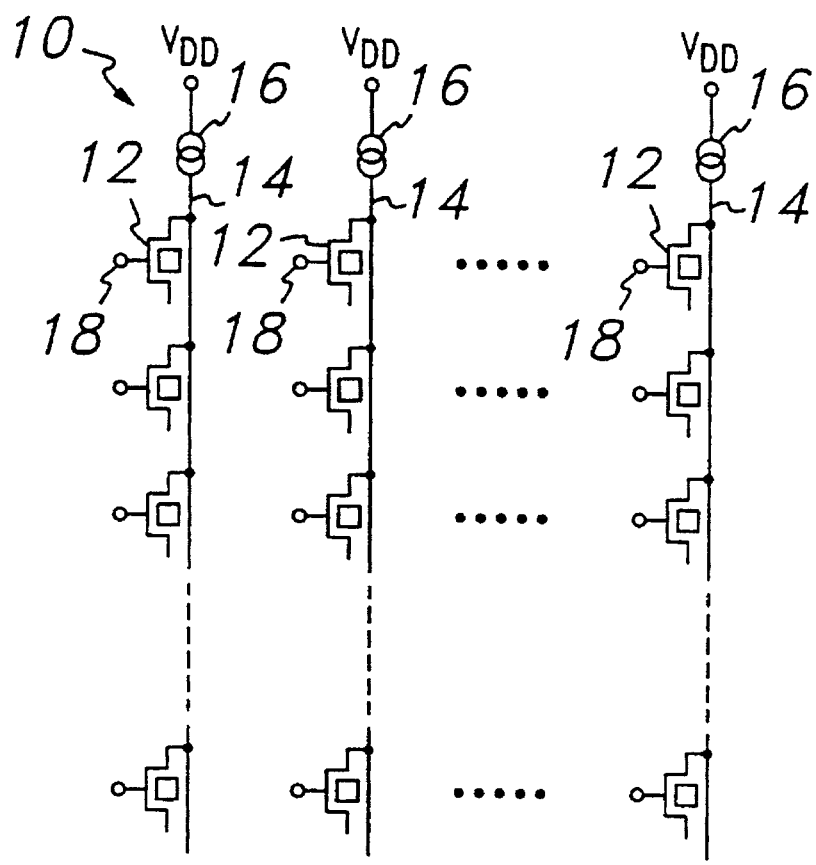
FIG. 1 is a prior art schematic circuit diagram of a photosite array with sense lines.
Figure 2:
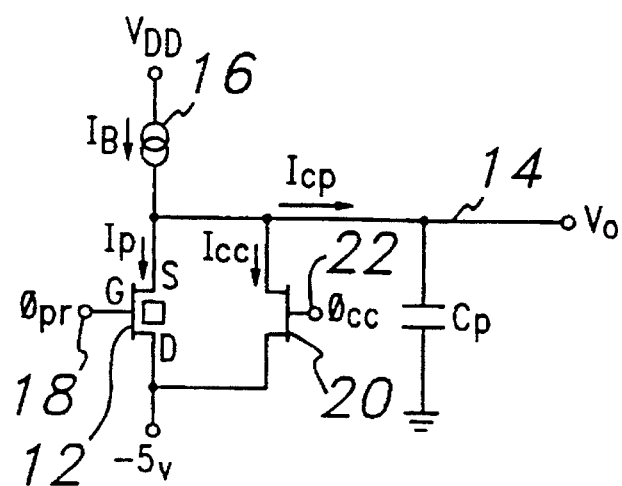
FIG. 2 is a schematic circuit diagram of a BCMD photosite cell and sense line of the first preferred embodiment of the present invention.

FIG. 2 is a schematic circuit diagram of a first preferred embodiment of a typical BCMD photosite transistor 12, current source 16, and column clamp transistor 20 used to pin the photosite source and drain at equal potentials during photosite bulk charge clearing. The capacitance Cp is the parasitic capacitance of the column sense line 14.

The photosite 12 can be, for example, a p-type buried channel MOS transistor with an additional deep p-type barrier and n-type well implanted under the transistor channel. The n-type well is used to store electrons generated by impinging photons. The photogenerated charge collected in the buried n-type well changes the potential profile of the transistor channel, resulting in a potential shift of the source follower's threshold voltage. By connecting the transistor as a source follower using current source 16 as a load, a voltage can be sensed at the source of the transistor which is dependent on the amount of charge accumulated. The difference in the source voltage between when the well has accumulated charge and when it has been cleared of charge is proportional to the photogenerated charge. The gate 18 is attached to an addresser, which applies one of three different potentials on the gate 18 during various stages of operation. The source of the transistor is tied to the sense column 14 which is common to all of the photosites 12 in one column of the array 10.

When the row of the photosite 12 is deselected (for example, during integration), the gate 18 is held at a positive potential with respect to the source, such as +5V. When one row is addressed and the signal is being read from photosite 12 on the sense line 14, the gate 18 of each photosite 12 in the row is held negative with respect to the source (0V, for example) to bias the transistor on and connect it to its corresponding sense column 14. When the photosite 12 is being cleared of charge, a positive potential is impressed upon gate 22 of column clamp transistor 20 and then the gates of the addressed photosites 12 are biased at a high negative potential, such as −5V, thus forcing the charge to spill over the deep p-type barrier into the substrate. Any excess charge generated by high light levels during the integration cycle will also spill over the barrier.

To read the photosite 12, the source follower's output is periodically sampled. After sampling, the charge in the well is removed by turning on the column clamp transistor 20, which pins the photosite's source and drain. Once the source and drain are connected by the action of transistor 20, the gate 18 of the photosite 12 is pulsed to remove the charge from the well. When the charge is cleared., the column clamp transistor 20 is turned off and the photosite 12 is allowed to return to its source follower mode. The source follower is re-sampled at this time. The delta potential between the two samples is proportional to the charge accumulated in the well.

The problem lies in the disturbance of the quiescent potential of the source follower during the turning on and off of the column clamp transistor 20. The delta signal induced by the threshold shift from the well charge is approximately 1 Volt maximum (the difference between an empty and full photosite). In other words, the difference in the source follower voltage when there is no charge in the well and when the well is full is approximately 1 Volt. The delta potential of the source of the photosite 12 is approximately 6 volts when the column clamp 20 is activated. This is because during sensing, the gate 18 is held at 0 Volts and the source will range from approximately 0 Volts for an empty well to approximately 1 Volt for a full well. When the column clamp transistor 20 is turned on, the source will be connected to the drain, which is normally tied to −5 Volts. When the column clamp transistor 20 is turned off, the source of the photosite 12 will return to approximately 0 Volts. To achieve high dynamic range from the photosite 12, the source follower must be given a large amount of time to achieve settling before readout. This is due to the fact that there is an appreciable stray capacitance $C_p$ shunting the photosite source which must be charged by the current source 16 which biases the photosite 12. If the photosite 12 is sampled while the current source 16 is still charging this stray capacitance, an error will result in the output voltage of the source follower. However, the amount of time allocated for the photosite to settle is limited by other operations which must occur during the limited horizontal blanking time. During the approximately 8 μs. horizontal blanking period, two lines of the sensor 10 must be addressed and sampled for data and two lines must be addressed and cleared.

The solution to minimize the time required for the source follower to settle after transitions of the column clamp transistor 20, is to increase or decrease the bias current of the transistor supplied by current source 16 during the transitions to speed up the settling process. The time required for the transition to occur is dependent on the parasitic capacitance of the sense node, as $dV/dt=I_{CP}/C_P$. This capacitance $C_P$ and the current source magnitude will set the dV/dt of the node.

During the transition where the column clamp transistor 20 is turned on ($I_P=0$), the current from the current source 16 slows down the transition since $I_{CC}=I_B-I_{CP}$. $I_{CC}$ is constant since, in this mode, column clamp transistor 20 is a constant impedance device, and $I_{CP}$ is negative (draining through column clamp transistor 20), the reduction of $I_B$ will allow the magnitude of $I_{CP}$ to increase, thus increasing the dV/dt of the node. When the column clamp transistor 20 is turned off, $I_B$ is the dominant current for charging the capacitance $C_P$. By increasing $I_B$, the dV/dt of the node will increase.

The only limit to this procedure is that if an excess amount of current is allowed to flow through the channel of the photosite 12, it will deplete the well capacity. This is because if large currents flow through the photosite 12 channel, the energy band changes, reducing the size of the n-well, thus reducing the well capacity. Since the gate 18 of the photosite 12 will be held at 0 volts, the device will be off until the source begins exceeding this value. It is critical at this point that the current from current source 16 is reduced down to the normal operating condition. Since the source of the device cannot be directly monitored at this time in the sequence, the potential should be calculated by $I_B=C_PdV/dt$ to determine the time when the current must be reduced.

A first implementation of the first preferred embodiment of the present invention is illustrated with the timing diagrams of FIG. 3A. $\phi_{CC}$ is the signal applied to gate 22 of column clamp transistor 20, $\phi_{pr}$ is the signal applied to gate 18 of photosite 12, and $V_B$ is the control voltage applied to the controllable current source 16 illustrated in FIG. 4. A value of 0V, for example, is applied to gate 18 of photosite 12 when $\phi_{pr}$ is low. A value of −5V, for example, is applied to gate 18 of photosite 12 when $\phi_{pr}$ is high. This gate value will deplete the n-well in the photosite 12 of electrons.

When $\phi_{cc}$ goes high, the column clamp transistor 20 is turned on. At the same time, the control voltage $V_B$, which controls the current source 16, is made more positive, which reduces $I_B$. This allows the photosite 12 source potential to decrease more rapidly, since $$\frac{dV}{dt} = \frac{I_{cp}}{C_P}$$

where $$I_{cc} = I_B - I_{cp}$$

$$-I_{cp} = I_{cc} - I_B$$

therefore $$-\frac{dV}{dt} = \frac{I_{cc} - I_B}{C_P}$$

When $I_B$ is decreased, the photosite 12 source potential may transition more rapidly to the negative potential, at which time $\phi_{pr}$ may be applied. After sufficient time has elapsed for the photosite 12 to clear, $\phi_{pr}$ and $\phi_{cc}$ are turned off.

At this time, it is desirable that the photosite 12 source potential be brought back up to 0V as quickly as possible. To do this, $I_B$ is increased by reducing the control voltage $V_B$ applied to the current source 16. Since $$I_{cp} = I_B - I_p$$

and $I_p \approx 0$ until the photosite 12 source voltage is $\approx 0V$, therefore $$I_{cp} = I_B$$

and $$\frac{dV}{dt} = \frac{I_{cp}}{C_P} = \frac{I_B}{C_P}$$

thus, increasing $I_B$ will increase dV/dt, as shown in FIG. 3A. This increased current goes to charge the sense line 14 parasitic capacitance $C_p$. The improvement in speed can be seen when compared to the dashed line in the photosite 12 source potential graph of FIG. 3A.

When the photosite 12 source potential approaches the gate 18 voltage (0V), the photosite 12 transistor begins to turn on and it is necessary at this point to reduce $I_B$ to ensure that $I_p$ is not so large that n-well depletion occurs in the photosite 12. Because $I_p$ is now no longer zero, $V_B$ must be increased, which lowers $I_B$, and the change in the photosite 12 source potential now returns to its normal rate of change, or $$\frac{dV}{dt} = \frac{I_B - I_p}{C_P}$$

Once $C_P$ is charged such that the photosite 12 source potential is stable, the sampling of the source voltage can begin.

The waveform for $V_B$ presented in FIG. 3A represents a digital implementation of the first preferred embodiment of the present invention. A second implementation of the first preferred embodiment of the present invention is an analog implementation and is illustrated in FIG. 3B. In this implementation, the $V_B$ signal is generated by applying the $\phi_{cc}$ signal to the current source 16 of FIG. 4 through a capacitor. This has the advantage of not requiring any circuitry to generate the digital $V_B$ signal, and the photosite 12 source potential response is substantially the same.

A few preferred embodiments have been described in detail hereinabove. It is to be understood that the scope of the invention also comprehends embodiments different from those described, yet within the scope of the claims.

Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image array having at least one photosite transistor, at least one column sense line and at least one column clamp transistor, wherein:

a source of said photosite transistor is coupled to said column sense line;

a source of said column clamp transistor is coupled to said photosite source;

a drain of said column clamp transistor is coupled to a drain of said photosite transistor;

a clocked voltage is applied to a gate of said column clamp transistor; and a variable current is coupled to said column sense line, the variable current is decreased when the clocked voltage is increased.

* * * * *